US009556703B2

(12) United States Patent
Daou et al.

(10) Patent No.: US 9,556,703 B2
(45) Date of Patent: *Jan. 31, 2017

(54) SWELLABLE ELASTOMER AND ITS USE IN ACIDIZING OR MATRIX STIMULATION

(71) Applicant: SCHLUMBERGER TECHNOLOGY CORPORATION, Sugar Land, TX (US)

(72) Inventors: Fatma Daou, Leblon (BR); Bernhard Lungwitz, Rio de Janeiro (BR); Olga Alexandrovna Minikh, Novosibirsk (RU); Diankui Fu, Novosibirsk (RU); Gregory Kubala, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 777 days.

This patent is subject to a terminal disclaimer.

(21) Appl. No.: 13/630,744

(22) Filed: Sep. 28, 2012

(65) Prior Publication Data
US 2014/0090844 A1 Apr. 3, 2014

(51) Int. Cl.
E21B 33/138 (2006.01)
E21B 43/26 (2006.01)
E21B 43/16 (2006.01)
C09K 8/035 (2006.01)
C09K 8/516 (2006.01)
C09K 8/70 (2006.01)
(Continued)

(52) U.S. Cl.
CPC .............. *E21B 33/138* (2013.01); *C09K 8/035* (2013.01); *C09K 8/516* (2013.01); *C09K 8/70* (2013.01); *C09K 8/76* (2013.01); *C09K 8/92* (2013.01); *E21B 43/16* (2013.01); *E21B 43/26* (2013.01)

(58) Field of Classification Search
CPC .... C09K 8/428; C09K 2208/12; E21B 43/164
USPC ........................................ 166/294, 300, 285
See application file for complete search history.

(56) References Cited

U.S. PATENT DOCUMENTS 3,252,904 A * 5/1966 Carpenter .............. C09K 8/685
166/282
6,581,701 B2 6/2003 Heying
7,726,400 B2 6/2010 Zusatz et al.
(Continued)

FOREIGN PATENT DOCUMENTS

EP 1623089 B1 7/2008
EP 2404975 A1 1/2012
WO 2004101951 A1 11/2004

OTHER PUBLICATIONS

Daniel L. Hertz, Jr., Elastomers in the Hot Sour Gas Environment, Seals Eastern Inc., P.O. Box 519, Red Bank, N.J. 07701, 6 pages.
(Continued)

Primary Examiner — Angela M DiTrani
Assistant Examiner — Ashish Varma
(74) Attorney, Agent, or Firm — Jeffrey R. Anderson; Tim Curington; Andrea E. Tran

(57) ABSTRACT

The current application discloses compositions and methods for treating a subterranean formation. CO2 swellable elastomers can be used in a treatment fluid to at least partially block a high permeability region, therefore improving the performance of an operation such as matrix stimulation, acidizing, and acid fracturing.

18 Claims, 2 Drawing Sheets

(51) Int. Cl.
*C09K 8/92* (2006.01)
*C09K 8/76* (2006.01)

(56) References Cited

U.S. PATENT DOCUMENTS

| | | | |
|---|---|---|---|
| 7,866,394 | B2 | 1/2011 | Creel et al. |
| 2008/0108524 | A1 | 5/2008 | Willberg et al. |
| 2009/0176667 | A1* | 7/2009 | Nguyen .................. C09K 8/70 507/204 |
| 2011/0077324 | A1 | 3/2011 | Ravi et al. |
| 2011/0083902 | A1 | 4/2011 | Huang et al. |
| 2011/0094746 | A1* | 4/2011 | Allison .................. C09K 8/40 166/308.5 |
| 2011/0183874 | A1* | 7/2011 | Ghassemzadeh ............. 507/124 |
| 2011/0257333 | A1 | 10/2011 | Adam et al. |

OTHER PUBLICATIONS

T. Pervez, S.Z. Qamar, R.A. Siddiqui, M. Van De Velden, Effect of Exposure on Material Response of a Swelling Elastomer, Archives of Materials Science and Engineering, Jun. 2009, pp. 77-84, vol. 37, Issue 2.

O.M. Davies, J.C. Arnold, S. Sulley, The mechanical properties of elastomers in high-pressure CO2, Journal of Materials Science 34 (1999) pp. 417-422.

* cited by examiner

etc.

SWELLABLE ELASTOMER AND ITS USE IN ACIDIZING OR MATRIX STIMULATION

RELATED APPLICATION DATA

None.

BACKGROUND

The statements in this section merely provide background information related to the present disclosure and may not constitute prior art.

The present application relates to the treatment of subterranean formations. More particularly, the present application relates to compositions and methods utilizing $CO_2$ activated swellable elastomers in acidizing or matrix stimulation.

Hydrocarbons (oil, natural gas, etc.) are typically obtained from a subterranean geologic formation (i.e., a "reservoir") by drilling a well that penetrates the hydrocarbon-bearing formation. In order for hydrocarbons to be "produced", that is, travel from the formation to the wellbore (and ultimately to the surface), there must be a sufficiently unimpeded flowpath from the formation to the wellbore. This flowpath is through the formation rock, e.g., solid carbonates or sandstones having pores of sufficient size, connectivity, and number to provide a conduit for the hydrocarbon to move through the formation.

In order to achieve sufficient production, hydrocarbon wells (e.g., oil wells) are often treated by removing (by dissolution) near-wellbore formation damage or by creating alternate flowpaths by fracturing or dissolving small portions of the formation at the fracture face. These variants of a stimulation operation are known as "matrix treatment", "acidizing," and "acid fracturing", respectively. Generally speaking, acids, or acid-based fluids, are useful for these stimulation operations due to their ability to dissolve both formation minerals (e.g., calcium carbonate) and contaminants (e.g., drilling fluid coating the wellbore or penetrated into the formation) introduced into the wellbore/formation during drilling or remedial operations. Conductive flow channels called wormholes are also formed, which extend approximately radially from the wellbore.

However, when acid is pumped into a subterranean formation, the acid flows preferentially into the highest solubility or the highest permeability regions, such as large pores, vugs or natural fractures. Acid reaction in the high-solubility or high-permeability region would leave the low permeability region substantially untreated. This is less desirable because the high permeability region already has high conductivity, and the low permeability region is more in need of the treatment. Moreover, acid that enters vugs or natural fractures may be substantially wasted.

There is a need for a fluid that can automatically plug the high permeability region and divert to the low permeability region.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, there is provided a method for treating a subterranean formation. The method comprises pumping into a borehole penetrating the subterranean formation a treatment fluid comprising a material that swells when contacts with carbon dioxide. The treatment fluid is exposed to carbon dioxide downhole and one of matrix stimulation, acidizing, and acid fracturing is performed to the subterranean formation.

According to another aspect, there is provided a method of treating a subterranean formation. The method comprises pumping into a borehole penetrating the subterranean formation a treatment fluid comprising a material that swells when contacts with a trigger that is not water, exposing the treatment fluid to the trigger; and allowing the material to swell and at least partially blocking a high permeability region in the subterranean formation.

In all aspects of the current application, the CO2 swellable material can be selected from a group consisting of chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1:
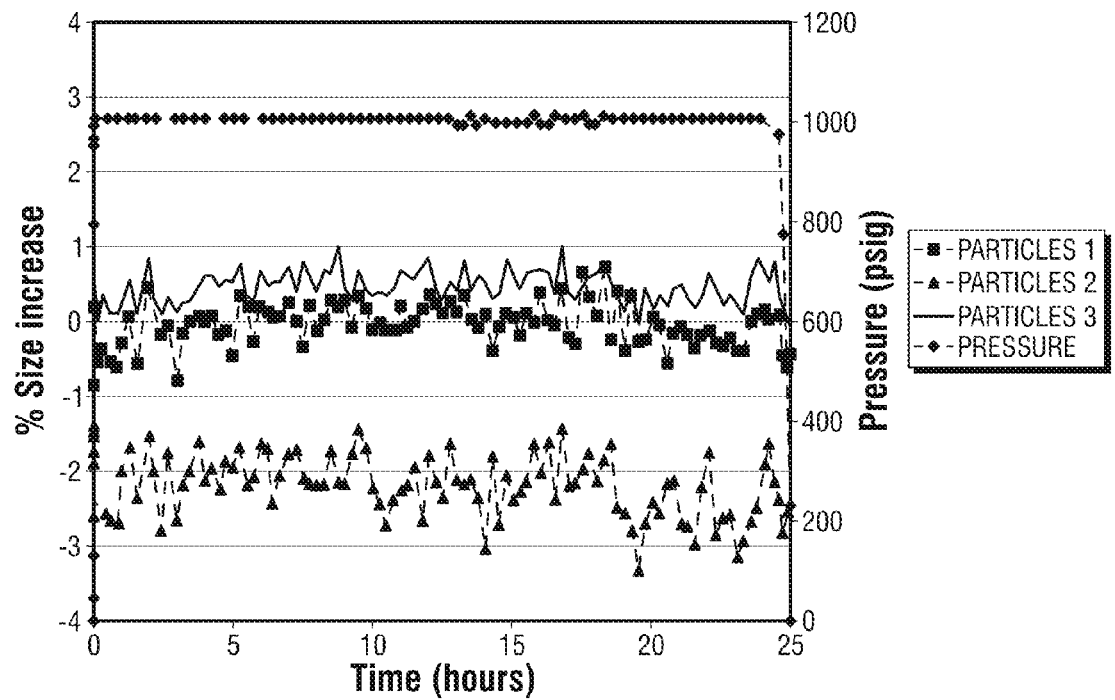
FIG. 1 shows the swelling behavior of VITON™ elastomer particles in the presence of nitrogen.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the Applicant appreciate and understands that any and all data points within the range are to be considered to have been specified, and that the Applicant possessed knowledge of the entire range and all points within the range.

As used herein, "embodiments" refers to non-limiting examples of the application disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein. Moreover, the schematic illustrations and descriptions provided herein are understood to be examples only, and components and operations may be combined or divided, and added or removed, as well as re-ordered in whole or part, unless stated explicitly to the contrary herein.

As used herein, the terms "treatment fluid" or "wellbore treatment fluid" should be understood broadly. These may be or include a liquid, a solid, a gas, and combinations thereof, as will be appreciated by those skilled in the art. A treatment fluid may take the form of a solution, an emulsion, a slurry, or any other form that is substantially continuous under a given condition, as will be appreciated by those skilled in the art.

In some embodiments, the wellbore treatment is a matrix treatment operation, as understood by people skilled in the art, and the treatment fluid is a matrix treatment fluid. In some embodiments, the wellbore treatment is an acidizing operation, as understood by people skilled in the art, and the treatment fluid is an acidizing fluid. In some embodiments, the wellbore treatment is an acid fracturing operation, as understood by people skilled in the art, and the treatment fluid is an acid fracturing fluid.

According to one aspect of the current application, the wellbore treatment fluid contains a swellable material that increases in size in an environment containing a trigger. In some embodiments, the trigger is carbon dioxide. In some embodiments, the trigger is hydrocarbon. In some embodiments, the trigger is $H_2S$. As used herein, the trigger is not water.

Treatment fluids containing an elastomer that swells in contact with a trigger, such as carbon dioxide, would positively solve the problem faced by the industry by at least partially sealing off the high permeability region in a subterranean formation, such as a void, a fracture, a hole, a channel or a combination thereof.

Taking the $CO_2$ swellable material as an example, the carbon dioxide may be wet, dry, supercritical or dissolved in an aqueous medium. In some embodiments, carbon dioxide is injected, stored, extracted or naturally present in a subterranean formation or a wellbore penetrating the subterranean formation. By naturally present, it should be understood that the carbon dioxide is present in the borehole, or the void/fracture/hole/channel in the subterranean formation at a concentration sufficient to active the swelling of the elastomer. Other triggers can also be injected, stored, extracted or naturally present in a subterranean formation or a wellbore penetrating the subterranean formation.

The concentration of carbon dioxide that is sufficient to active the swelling of the elastomer is dependent on the swellable material that is used in the operation and can be determined in laboratory or field. In some embodiments, the concentration of carbon dioxide is at least 1 mole per liter of fluid; in some embodiments, the concentration of carbon dioxide is at least 2.5 moles per liter of fluid; in some embodiments, the concentration of carbon dioxide is at least 5 moles per liter of fluid.

Examples of the elastomers that are suitable for the current application include, but are not limited to, chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof. The aqueous inverse emulsion of polymer comprising a betaine group can be manufactured by the methods and/or materials described in US2011/0257333 and EP2404975, the entire contents of both are hereby incorporated by reference into the current application.

The concentration of the material in the treatment fluid may be between about 5% and 50% by volume of solids in the treatment fluid. In some embodiments, the range may be between about 10% and 40% by volume of solids in the treatment fluid. In some embodiments, the range may be between about 15% and 30% by volume of solids in the treatment fluid. For optimal performance, the particle-size distribution of the material may be such that the average particle size is between about 10 µm and about 1000 µm. The average particle size may also be between about 100 µm and 900 µm.

In some embodiments, the swelling capability of the swellable material is enhanced under downhole pressure. Stated in other words, in some embodiments, the swellable material does not swell, or only swell to a limited degree, when prepared at the surface or being delivered from the surface to the downhole target zone. However, such swellable material swells, or swells to a full degree, when it is successfully delivered to the downhole target zone and subject to the downhole pressure.

The treatment fluid may further comprise dispersing agents, fluid-loss-control agents, set retarders, set accelerators, foaming agents, gas generating agents, antifoaming agents, extenders, weighting agents, lost-circulation control agents and combinations thereof. Other compounds may also be present such as coal, petroleum coke, graphite or gilsonite and mixtures thereof. Further, the carbon dioxide swellable elastomers may be couple to water super absorbent polymers such as those described in EP 1623089 incorporated herein in its entirety. A further association may be with one or more compounds from the list comprising poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers and bivalent cationic compounds or any other particles such as those described in WO2004/101951 that swells when exposed to liquid hydrocarbons, the international application being incorporated herein by reference in its entirety. Further combination may be made with thermoplastic block polymers including for example styrene-isoprene-styrene (SIS), styrene-butadiene-styrene (SBS) and mixtures thereof.

The fluids and methods of the current application are useful in both sandstone reservoirs and carbonate reservoirs. In particular, the fluids and methods of the current application are useful in carbonate reservoirs, including limestone and dolomite, because the abundant production of carbon dioxide in-situ during a matrix or acidizing treatment. Nevertheless, applications in other types of subterranean formation are also contemplated.

In some embodiments, the treatment is performed below the fracture pressure of the subterranean formation. In some embodiments, the treatment is performed above the fracture pressure of the subterranean formation.

In some embodiments, the effect of at least partially blocking the high permeability region is achieved by exposing the swellable material to an in-situ trigger, such as carbon dioxide. In some embodiments, the effect of at least partially blocking the high permeability region is achieved by exposing the swellable material to a trigger that is generated downhole during the oilfield operation. In some embodiments, the effect of at least partially blocking the high permeability region is achieved by exposing the swellable material to a trigger that is introduced downhole during the oilfield operation.

Specific examples of introducing or generating trigger downhole include, but are not limited to, foaming, emulsifying, inverse-emulsifying, encapsulation, inclusion of acid-generating compounds which reacts with subterranean formation to generate reservoir fluid, etc.

In some embodiments, the swellable elastomer are used in combination with degradable materials such as particles or/and fibers and fibrous materials. To enhance $CO_2$ concentration in fractures, materials which generate acid under downhole conditions can be added. The material may enter into a fracture and generate acid, which reacts with carbonate formation to produce carbon dioxide. The carbon dioxide in combination with in-situ $CO_2$ assures further swelling of the elastomers. Examples of acid-generating materials include, but are not limited to, wax-capsules with citric acid powder and different PLA materials. Wax-capsules melt downhole thus releasing acid. PLA materials decompose gradually while generating acid. Gradual acid release into carbonate formation provides constant $CO_2$ supply and guarantees plug stability over time. PLA materials can be particles and/or fibers.

In some embodiments, the swellable elastomer are used in combination with a $CO_2$ generating material, such as calcium carbonate. The calcium carbonate can be granules in various sizes. In some embodiments, the calcium carbonate are a mixture of multiple granules of different diameters, therefore providing a combination of different sizes of particles to facilitate the blocking of high permeability regions (such as pores, vugs, or natural fractures) of different sizes. The calcium carbonate can be further encapsulated to delay the acid-carbonate reaction. Alternatively or in addition, the acid can be formulated in emulsions, therefore allowing slower movement of the acid away from the near wellbore region and/or into the formation. A degradable material such as the ones described above may also be used in combination with calcium carbonate.

In some embodiments, a fluid loss pill can be prepared and pumped downhole during a well operation. The pill may include the $CO_2$-swellable elastomers alone or together with degradable materials which are suspended in acidic fluid. Once it reaches the fractured zones, the pill may react with the formation fluid, dissolve carbonate to emit more $CO_2$ and swell under downhole conditions, gain volume and eventually block the high permeability region.

EXAMPLES

The following examples serve to further illustrate the disclosure. The following testing procedure was used for all examples.

Several particles of a test elastomer were placed inside a pressure cell equipped with a window that allows one to observe the behavior of materials within the cell. The cell supplier is Temco Inc., located in Houston, Tex. USA. The cell temperature is also adjustable. A camera captures images from inside the pressure cell, and image-analysis software is employed to interpret the behavior of materials inside the cell. After the elastomer particles were introduced into the cell, the cell was sealed. Either nitrogen or carbon dioxide gas was then introduced into the cell at 1000 psi (6.9 MPa), and the camera recorded the sizes of the particles during exposure periods up to 25 hours at 21° C. (70° F.).

Example 1

An O-ring made from a chlorofluorocarbon elastomer (VITON™, available from Parker Seals) was ground into pieces that were about 200 μm in size. Three particles (P1, P2 and P3) were placed into the pressure cell, and nitrogen was pumped into the cell until the pressure reached 1000 psi (6.9 MPa). During the testing period, the size of the VITON™ particles was periodically monitored. The results, shown in FIG. 1, reveal little change in the size of the particles during the test period.

Figure 2:
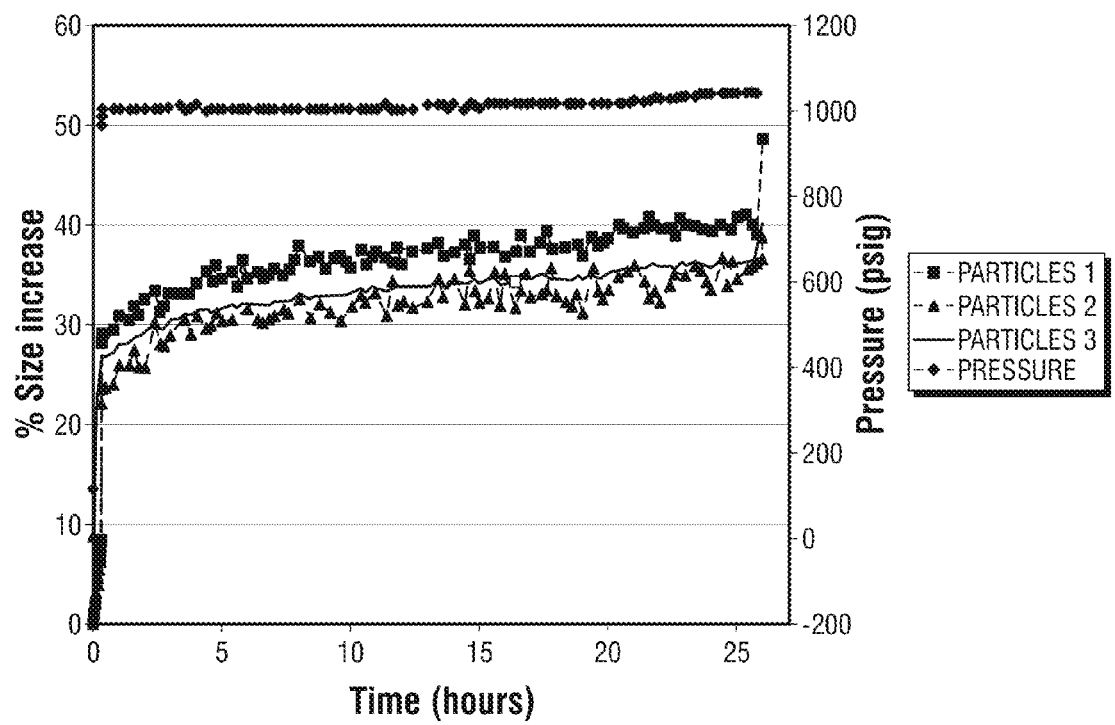
FIG. 2 shows the swelling behavior of VITON™ elastomer particles in the presence of carbon dioxide.

Then, the three VITON™ particles were exposed to carbon dioxide at about 1000 psi (6.9 MPa) and 21° C. As shown in FIG. 2, the particles swelled by about 35-48 vol % during the test period.

Example 2

Figure 3:
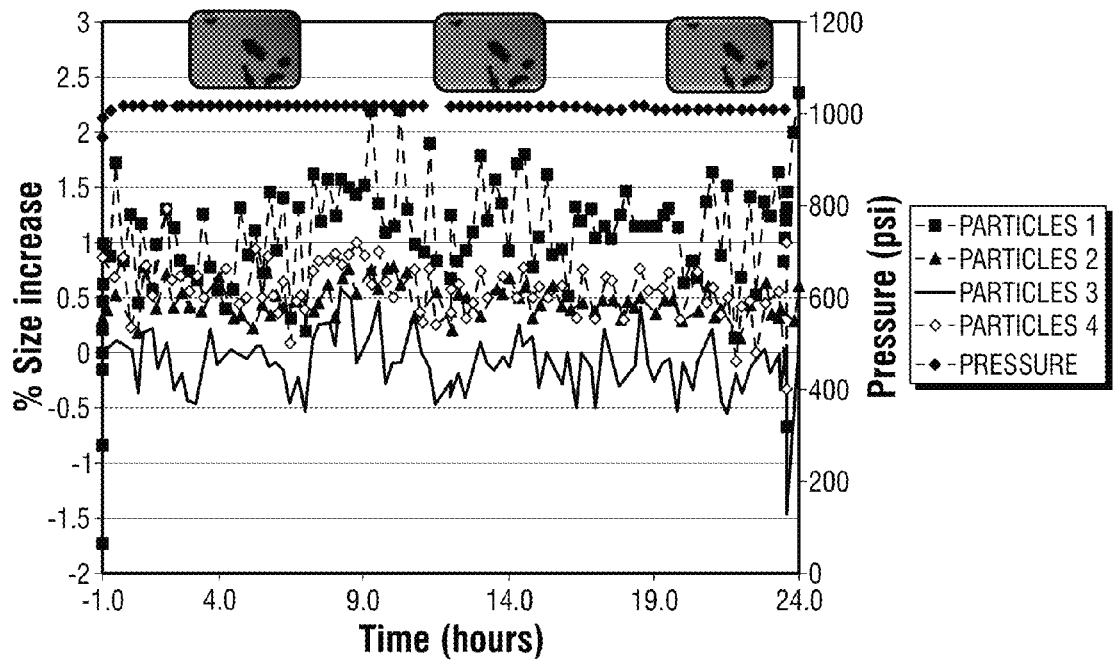
FIG. 3 shows the swelling behavior of AFLAS™ elastomer particles in the presence of nitrogen.

An O-ring made from a fluoroelastomer (AFLAS™, available from Seals Eastern) was ground into pieces that were about 200 μm in size. Four particles (Particles 1, 2, 3 and 4) were placed into the pressure cell, and nitrogen was pumped into the cell until the pressure reached 1000 psi (6.9 MPa). During the testing period, the size of the AFLAS™ particles was periodically monitored. The results, shown in FIG. 3, reveal little change in the size of the particles during the test period.

Figure 4:
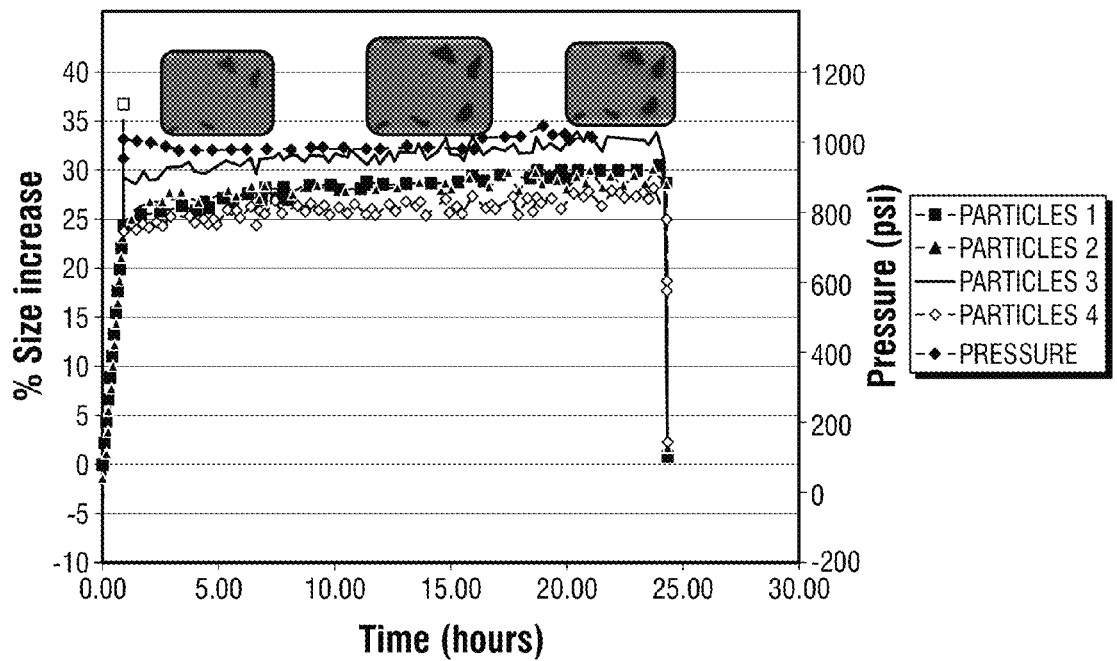
FIG. 4 shows the swelling behavior of AFLAS™ elastomer particles in the presence of carbon dioxide.

Then, the AFLAS™ particles were exposed to carbon dioxide at about 1000 psi (6.9 MPa) and 21° C. As shown in FIG. 4, the particles swelled by about 25-37 vol % during the test period Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

We claim:

1. A method of treating a subterranean formation, comprising:
   (i) pumping into a borehole penetrating the subterranean formation a treatment fluid comprising a material that swells when contacts with a trigger comprising carbon dioxide;
   (ii) exposing the treatment fluid to the trigger; and
   (iii) allowing the material to swell and at least partially blocking a high permeability region in the subterranean formation
wherein the treating is selected from a group consisting of matrix stimulation, acidizing, and acid fracturing.

2. The method of claim 1, wherein the material comprises an elastomer comprising chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof.

3. The method of claim 1, wherein the concentration of the material in the treatment fluid is between about 5 percent and about 50 percent by volume of the treatment fluid.

4. The method of claim 1, wherein the average particle size of the material is between about 10 μm and about 1000 μm.

5. The method of claim 1, wherein the subterranean formation contains a carbon dioxide concentration greater than about five moles per liter.

6. The method of claim 1, wherein the carbon dioxide is injected into the borehole.

7. The method of claim 1, wherein the carbon dioxide is encapsulated in a particulate contained in the treatment fluid.

8. The method of claim 1, wherein the carbon dioxide is generated from a carbon dioxide generating agent contained in the treatment fluid.

9. The method of claim 8, wherein the carbon dioxide generating agent is calcium carbonate.

10. The method of claim 1, wherein the treatment fluid further comprises an acid-in-oil emulsion.

11. A method, comprising:
    (i) pumping into a borehole penetrating a subterranean formation a treatment fluid comprising a material that swells when contacts with carbon dioxide;
    (ii) exposing the treatment fluid to carbon dioxide downhole; and
    (iii) performing one of matrix stimulation, acidizing, and acid fracturing to the subterranean formation.

12. The method of claim 11, wherein the material comprises an elastomer comprising chlorofluorocarbons, tetrafluoroethylene-propylene copolymers, ethylene-propylene copolymers, isobutene-isoprene rubbers, nitrile rubbers, hydrogenated nitrile butadiene rubbers, tetrafluoroethylene-perfluorovinyl methyl ether copolymers, an aqueous inverse emulsion of polymer comprising a betaine group and combinations thereof.

13. The method of claim 11, wherein the concentration of the material in the treatment fluid is between about 5 percent and about 50 percent by volume of the treatment fluid.

14. The method of claim 11, wherein the subterranean formation containing fluid with a carbon dioxide concentration greater than about five moles per liter.

15. The method of claim 11, wherein the carbon dioxide is injected into the borehole.

16. The method of claim 11, wherein the carbon dioxide is generated from a gas generating agent contained in the treatment fluid.

17. The method of claim 16, wherein the gas generating agent is calcium carbonate.

18. The method of claim 11, wherein the treatment fluid further comprises an acid-in-oil emulsion.

* * * * *